US006099635A

United States Patent [19]

Rosas et al.

[11] Patent Number: 6,099,635

[45] Date of Patent: Aug. 8, 2000

[54] ACETOACETYLATED SUSPENSIONS IN PIGMENT APPLICATIONS

[75] Inventors: Rebecca Lee Rosas; James Michael McCormick, both of Houston, Tex.

[73] Assignee: Lonza AG, Basel, Switzerland

[21] Appl. No.: 09/289,309

[22] Filed: Apr. 9, 1999

[51] Int. Cl.$^7$ .............................. C09B 69/00; C08K 5/16

[52] U.S. Cl. .......................... 106/493; 106/494; 106/496; 106/499

[58] Field of Search .................................... 106/493, 494, 106/496, 499

[56] References Cited

U.S. PATENT DOCUMENTS

| | | | |
|---|---|---|---|
| 4,254,025 | 3/1981 | Kramer | 534/689 |
| 4,558,158 | 12/1985 | Tenud et al. | 564/194 |
| 4,643,770 | 2/1987 | Hays | 106/496 |
| 4,648,907 | 3/1987 | Hays et al. | 106/496 |
| 4,664,710 | 5/1987 | Gleason et al. | 106/496 |
| 4,885,033 | 12/1989 | Blackburn et al. | 106/494 |
| 5,800,609 | 9/1998 | Tuck et al. | 106/496 |
| 5,863,459 | 1/1999 | Merchak et al. | 252/301.16 |
| 5,869,625 | 2/1999 | Jaffe et al. | 8/638 |

*Primary Examiner*—Anthony Green
*Attorney, Agent, or Firm*—Darby & Darby

[57] ABSTRACT

This invention provides a process for forming an acetoacetarylide-based pigment, comprising: (a) reacting a diketene with an amine to form an acetoacetarylide slurry; (b) separating the acetoacetarylide as a solid from the acetoacetarylide slurry; (c) adding the acetoacetarylide solid to a homogenizer; (d) homogenizing the acetoacetarylide in the presence of water and one or more additives to form an acetoacetarylide slurry; (e) pumping the acetoacetarylide slurry to a reaction tank; (f) adding an alkali or alkaline metal base to the slurry; (g) adding an acid to form a precipitate of the acetoacetarylide; and (h) reacting the precipitate with an azo compound, thereby forming a pigment. This invention also includes the pigments and intermediates thereto formed by the above processes.

20 Claims, No Drawings

ACETOACETYLATED SUSPENSIONS IN PIGMENT APPLICATIONS

BACKGROUND OF THE INVENTION

Acetoacetarylide-based pigments are used in printing inks, paints, colored plastics, colored office articles, cosmetics, and colored paper because of their superior combination of rheology, stability, and color strength. Because of their widespread use, a simple, efficient synthesis of acetoacetarylide-based pigments would be of great commercial importance.

Previous methods for forming acetoacetarylide-based pigments have been hampered by the fact that production of purified acetoacetarylides results in an acetoacetarylide solid that is bulky and difficult to handle. The transport of solid acetoacetarylide in bags, drums, or other containers, as performed in previous methods for forming acetoacetarylide-based pigments, is difficult, time consuming, and expensive. Further, the solid acetoacetarylide containers generate waste and the arylide itself generates dust which is an industrial hygiene concern.

SUMMARY OF THE INVENTION

This invention provides a method of suspending solid acetoacetarylide species in a solvent using additives and homogenation equipment in order to prepare a heterogeneous slurry having a concentration appropriate for use in pigment applications. The creation of a flowable acetoacetarylide prior to reaction with an alkali base, acetic acid, and an a diazotized compound eliminates tedious steps from the pigment manufacturing process. Unlike prior art processes where addition of NaOH and/or acetic acid is used to create an acetoacetarylide slurry (see e.g. Gleason, et al., U.S. Pat. No. 4,664,710), this invention creates an acetoacetarylide slurry prior to NaOH and acetic acid addition. Further, unlike previous methods that rely solely on solvents to dissolve acetoacetarylides, this invention utilizes additives and homogenization equipment to ensure that an acetoacetarylide slurry with the proper flow characteristics is formed.

Unlike the present invention which introduces additives during or just prior to homogenization of the acetoacetarylide, prior acetoacetarylide-based pigment manufacturing processes introduce the additives later, usually during diazotization or afterwards (see e.g. Gleason, et al., U.S. Pat. No. 4,664,710 and Merchak, et al. U.S. Pat. No. 5,863,459). In addition, the use of additives in the subject invention during acetoacetarylide slurry formation can also confer unique and desirable properties on the finished pigment. Depending upon the additive, the improved properties may include: better rheology, stability, holdout, color strength, and/or gloss.

This invention provides a process for forming an acetoacetarylide-based pigment, comprising: (a) reacting a diketene with an amine to form an acetoacetarylide slurry; (b) separating the acetoacetarylide as a solid from the acetoacetarylide slurry; (c) adding the acetoacetarylide solid to a homogenizer; (d) homogenizing the acetoacetarylide in the presence of water and one or more additives to form an acetoacetarylide slurry; (e) pumping the acetoacetarylide slurry to a reaction tank; (f) adding an alkali or alkaline metal base to the slurry; (g) adding an acid to form a precipitate of the acetoacetarylide; and (h) reacting the precipitate with an a diazotized compound, thereby forming a pigment.

Acetoacetarylide slurries that may be formed include: acetoacetanilide, acetoacet-o-toluidide, acetoacet-p-toluidide, acetoacet-o-anisidide, acetoacet-m-xylidide, acetoacet-p-phenetidide, acetoacet-p-anisidide, and acetoacet-4-chloro-2,5-dimethoxyanilide.

In one example, the additives used to homogenize the acetoacetarylide are suspension additives. In another embodiment, one or more of the additives is a customer specified additive. For instance, the customer specified additive may be a surfactant to control the particle size and/or flowability of the pigment.

This invention also includes the pigments and intermediates thereto formed by the above processes.

DETAILED DESCRIPTION OF THE INVENTION

All references cited in the subject application are fully incorporated by reference. To the extent that a conflict may exist between any of the cited references and the disclosure of this application, the language of this application controls.

Acetoacetarylide-based pigments are well known. Tenud, et al., U.S. Pat. No. 4,558,158; Hays, U.S. Pat. No. 4,643,770; Hays, et al., U.S. Pat. No. 4,648,907; and Blackburn, et al., U.S. Pat. No. 4,885,033 disclose numerous examples of acetoacetarylide-based pigments. Methods of preparing acetoacetarylide-based pigments are also well known in the art and are disclosed in Tenud, et al., U.S. Pat. No. 4,558,158; Hays, et al., U.S. Pat. No. 4,648,907; and Blackburn, et al., U.S. Pat. No. 4,885,033.

This invention provides a process for forming an acetoacetarylide-based pigment, including Steps A–H as follows.

A. Reacting a Diketene with an Amine to Form an Acetoacetarylide Slurry;

Numerous diketenes and amines can be reacted to form an acetoacetarylide as exemplified below.

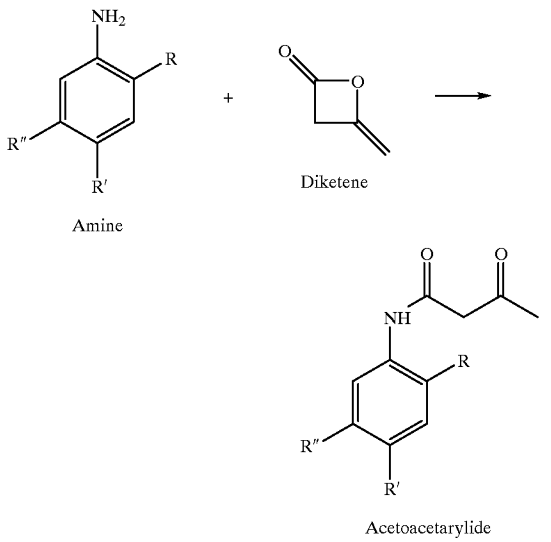

Acetoacetarylide slurries that may be formed include: acetoacetanilide, acetoacet-o-toluidide, acetoacet-p-toluidide, acetoacet-o-anisidide, acetoacet-m-xylidide, acetoacet-p-phenetidide, acetoacet-p-anisidide, and acetoacet-4-chloro-2,5-dimethoxyanilide. In the above equation:

a. for an acetoacetanilide, R, R', and R" are hydrogen;

b. for an acetoacet-o-toluididc, R is methyl; and R' and R" are hydrogen;

c. for an acetoacet-p-toluidide, R and R" are hydrogen; and R' is methyl;
d. for an acetoacet-o-anisidide, R is a methoxy; and R' and R" are hydrogen;
e. for an acetoacet-p-anisidide, R and R" are hydrogen; and R' is methoxy;
f. for an acetoacet-p-phenetidide, R and R" are hydrogen; and R' is ethoxy;
g. for an acetoacet-m-xylidide, R and R' are methyl; and R" is hydrogen; and
h. for an acetoacet-4-chloro-2,5-dimethoxyanilide, R and R" are methoxy; and R' is chlorine.

B. Separating the Acetoacetarylide as a Solid from the Acetoacetarylide Slurry;

In a preferred embodiment, the acetoacetarylide solid is separated from the slurry by a centrifuge. Numerous other separation methods are known to those skilled in the art, including: filter pressing, belt filtering, decanting, and Nutsche filtering.

C. Adding the Acetoacetarylide Solid to a Homogenizer;

In a preferred embodiment, the acetoacetarylide solid is added step-wise to the homogenizer.

D. Homogenizing the Acetoacetarylide in the Presence of Water and One or More Additives to Form an Acetoacetarylide Slurry;

In one example, the additives present during the homogenization of the acetoacetarylide are suspension additives. In a preferred embodiment, one or more of the additives used to homogenize the acetoacetarylide is an N-alkyl amine oxide. In another embodiment, one or more of the additives alter the color or consistency of the pigment, such as to achieve customer specified properties. For instance, a customer specified additive may be a surfactant to control the particle size and/or flowability of the pigment. The homogenizer used to form the acetoacetarylide slurry can be in-line or batch.

In one embodiment, the acetoacetarylide slurry formed in the above process is heterogenous. In a preferred embodiment, the concentration of the acetoacetarylide slurry formed after homogenization is between 30 and 40 weight %.

E. Pumping the Acetoacetarylide Slurry to a Reaction Tank;

Preferably, a slurry pump capable of moving high solid content slurries without applying significant sheer to the material is used to pump the acetoacetarylide slurry to a reaction tank. The percentage acetoacetarylide solid concentration can be monitored using a mass flow meter or a flow cell capable of measuring density or viscosity.

F. Adding an Alkali or Alkaline Metal Base to the Acetoacetarylide Slurry;

In a preferred embodiment, the base is added to the acetoacetarylide slurry via a dip tube. A preferred base is sodium hydroxide. Other suitable bases include, but are not limited to, potassium hydroxide and lithium hydroxide. Buffering agents (i.e. sodium acetate-acetic acid) can also be used.

G. Adding an Acid to Form a Precipitate of the Acetoacetarylide; and

In a preferred embodiment, the acid used to form a precipitate of the acetoacetarylide is added via a dip tube. A preferred acid is acetic acid. In another embodiment, the acid used to form a precipitate of the acetoacetarylide is formic acid or oxalic acid.

H. Reacting the Precipitate with an a Diazotized Compound, Thereby Forming a Pigment.

Several examples of diazotized compounds that can be used to form a pigment include: diazotized dichlorobenzidine, o-dianisidine, o-ditoluidine, p-chloro-o-nitroaniline, and p-nitro-o-methoxyaniline. One skilled in the art would recognize that numerous other diazotized compounds can be used. See e.g. U.S. Pat. No. 4,254,025 to Kramer and U.S. Pat. No. 5,869,625 to Jaffe, et al.

This invention also includes the pigments and intermediates thereto formed by the above processes.

The following examples are intended to illustrate the invention but not to limit its scope. One skilled in the art would recognize numerous other embodiments of the invention.

EXAMPLES

Example 1

Homogenizing an Acetoacetarylide to Prepare an Acetoacetarylide Slurry

1. Thoroughly clean a 3,000 gallon, 316 stainless steel reactor (Pfaudler, New York) with acetone and water washes. Preferable, the inside of the reactor is at atmospheric pressure—a vacuum is to be avoided under all circumstances. (A nitrogen pad is not required.)
2. Set cooling jacket of reactor to maintain product inside reactor at 25 degrees C.
3. Charge water to the reactor and start agitation at 50% of full scale. The amount of water charged should be 2500 lbs.
4. Open bottom valve of the reactor and start in-line mixer at 10% of full scale.
5. Add acetoacetarylide solids (addition #1) from drums through the solid addition chute of the reactor. Introduce about 25% (400 lb) of the total charge of acetoacetarylide (1600 lbs. on a 100% basis) through the solids addition chute (addition #1). Increase the in-line mixer speed to provide circulation of the material back into the reactor.
6. Once the material appears homogenous, add the next 25% of acetoacetarylide (addition #2). Increase the in-line mixer and agitator speed. The temperature is maintained at 25 degrees C.
7. For additions three and four of acetoacetarylide, proceed as in step 5. Visually verify the mixture is homogeneous through the sight glass and that material is recirculating back through the in-line mixer to the reactor.
8. Slowly add between 0. 15% and 2.5% of a surfactant (i.e. Barlox 12I-Lonza, Mapleton, Ill., USA). (The amount will depend on the behavior of the material once sampled.) Prior and during the addition of the surfactant, agitation and in-line mixer speeds are immediately reduced to minimize foaming and cavitation of the mixer.
9. Allow the material to agitate and mix for two hours and then sample. The measurement of either the density or the viscosity is used to determine % solids. This number can be compared to a calibrated viscosity or density versus % solids curve to determine the % solids for the slurry.

EXAMPLE 2

Homogenization of an Acetoacetanilide to Prepare an Acetoacetanilide Slurry

This example uses acetoacetanilide (AAA)-dry material, water, and a mixture of several N-alkyl amine oxide additives in water and a homogenizer to prepare a slurry of 30–40 concentration AAA (100% basis). In this process, water is added to the reactor and then the homogenizer (either in line or batch) is started with a low rpm setting. If the in-line homogenizer is used, then the reactor agitator is also started at its average speed. The dry AAA is added at a rate to permit the resulting slurry to mix well and also not to overload the mixing capability of the reactor and the homogenizer. During the addition of AAA, the homogenizer speed is increased for additional mixing. Once all the solid has been added, the additives are poured into the reactor. Vacuum suction of this material into the reactor may cause foaming to occur. As the additives are introduced into the reactor, the homogenizer speed can be reduced as the material is no longer thick: it becomes more fluid in nature. A combination of the homogenizer plus agitator in the reactor (if homogenizer is in-line) is used to keep material moving until it is transferred to a drum, tote, tank truck, iso container or railcar.

Similar reaction conditions can be used to prepare slurries of acetoacet-o-toluidide, acetoacet-p-toluidide, acetoacet-o-anisidide, acetoacet-m-xylidide, acetoacet-p-phenetidide, acetoacet-p-anisidide, and acetoacet-4-chloro-2,5-dimethoxyanilide.

EXAMPLE 3

Synthesis of Pigment Yellow 12 Using Diketene and Amine Starting Materials

Diketene and aniline in an approximately stoichiometric ratio are charged to a reactor containing a solvent blend ((diketene+aniline)/solvent ratio is 0.25) at 25° C. at atmospheric pressure. The reaction is exothermic and the temperature continues to rise to approximately 60° C. whereupon the reactor jacket is set to full cool to bring the temperature back to 25° C. in the reactor. During the cooling process, acetoacetanilide (AAA) crystallizes and falls out of solution and a mixture of AAA and solvent blend is made.

This mixture, once cooled, is filtered, where the AAA is removed from the solvent and washed to remove impurities.

The centrifuged AAA is analyzed for moisture content. The reactor (equipped with a high shear mixer on a recirculation line or as part of the agitator-batch mixer) for the slurry preparation is filled with water (2500 lbs). The reactor jacket is set so that the material inside the reactor remains at 25 ° C. and the agitator is set at 50% of full scale with the pressure on the reactor at atmospheric (no vacuum, no nitrogen). The filtered AAA is added in four portions, after each portion the rpms to the homogenizer (either in line or batch) is increased so that the material is fluid. After the fourth addition, the rpm should be at a maximum. The surfactant(s) are added slowly while decreasing the speed of the mixer to ¼ scale. After 2 hours, the homogenizer is stopped and the agitator is allowed to mix the slurry in the tank.

Using a slurry pump to minimize shear and move the high % solids, this material is transferred to a shipping container (drums, totes, or tank trucks). A mass flowmeter or a scale can also be used to determine the amount of slurry transferred. The material is then shipped to a customer site where it is transferred into an agitated storage tank. From this storage tank the material is transferred via a slurry pump into the coupling storage tank where 50% caustic is added to dissolve the mixture. Ice is added to control the dissolution to a desired temperature. Once dissolution is complete, acetic acid (70%) is added to reprecipitate the arylide. This reprecipitated arylide is then pumped to a strike tank where it is mixed with diazotized dichlorobenzidine. The resulting mixture contains the pigment yellow 12 which is then finished according to the desired application.

What is claimed is:

1. A process for forming an acetoacetarylide-based pigment, comprising:

(a) adding an acetoacetarylide solid to a homogenizer containing water;

(b) adding one or more suspension additives to the acetoacetarylide in the homogenizer to form a mixture;

(c) homogenizing the mixture of acetoacetarylide and one or more additives, thereby forming a slurry of the acetoacetarylide; and (d) reacting the slurry to form an acetoacetarylide-based pigment.

2. The process of claim 1, wherein the reacting of step (d) comprises:

i. adding an alkali or alkaline metal base to the slurry;

ii. adding an acid to form a precipitate of the acetoacetarylide; and iii. reacting the precipitate with a diaztoized compound, thereby forming a pigment.

3. The process of claim 2, wherein the base is sodium hydroxide.

4. The process of claim 2, wherein the acid is acetic acid.

5. The process of claim 1, wherein one or more of the suspension additives is a surfactant to control particle size and/or flowability of the pigment.

6. The process of claim 1, wherein one or more of the suspension additives is an N-alkyl amine oxide.

7. The process of claim 1, wherein the acetoacetarylide is present in the slurry in a concentration of between 30 weight % and 40 weight %.

8. The process of claim 7, wherein the slurry is heterogenous.

9. The process of claim 8, wherein the slurry is pumpable.

10. The process of claim 1, wherein the acetoacetarylide of step (a) is selected from the group consisting of acetoacetanilide, acetoacet-o-toluidide, acetoacet-p-toluidide, acetoacet-o-anisidide, acetoacet-m-xylidide, acetoacet-p-phenctidide, acetoacet-p-anisidide, and acetoacet-4-chloro-2,5-dimethoxyanilide.

11. A process for forming an acetoacetarylide-based pigment, comprising:

a. reacting a diketene with an amine to form an acetoacetarylide slurry;

b. separating the acetoacetarylide as a solid from the acetoacetarylide slurry;

c. adding the acetoacetarylide solid to a homogenizer;

d. homogenizing the acetoacetarylide in the presence of water and one or more suspension additives to form an acetoacetarylide slurry;

e. pumping the acetoacetarylide slurry of step d to a reaction tank;

f. adding an alkali or alkaline metal base to the acetoacetarylide slurry of step e;

g. adding an acid to form a precipitate of the acetoacetarylide of step f; and h. reacting the precipitate with a diazotized compound, thereby forming a pigment.

12. The process of claim 11, wherein the acetoacetarylide of step a is selected from the group consisting of acetoacetanilide, acetoacet-o-toluidide, acetoacet-p-toluidide, acetoacet-o-anisidide, acetoacet-m-xylidide, acetoacet-p-phenetidide, acetoacet-p-anisidide, and acetoacet-4-chloro-2,5-dimethoxyanilide.

13. The process of claim 11, wherein the separating of step b is performed using a centrifuge.

14. The process of claim 11, wherein the adding of step c comprises adding the acetoacetarylide solid step-wise to a homogenizer.

15. The process of claim 11, wherein the homogenizer of step c is in-line.

16. The process of claim 11, wherein the homogenizer of step c is batch.

17. The process of claim 11, wherein one or more of the suspension additives of step d is an N-alkyl amine oxide.

18. The process of claim 11, wherein the acetoacetarylide in the slurry formed in step d is present in a concentration of between 30 weight % and 40 weight %.

19. The process of claim 11, wherein the base of step f is sodium hydroxide.

20. The process of claim 11, wherein the acid of step g is acetic acid.

* * * * *

UNITED STATES PATENT AND TRADEMARK OFFICE

CERTIFICATE OF CORRECTION

PATENT NO. : 6,099,635
DATED : August 8, 2000
INVENTOR(S) : Rebecca L. ROSAS and James Michael McCORMICK It is certified that error appears in the above-identified patent and that said Letters Patent is hereby corrected as shown below:

Title page, item [75] inventors, please change the city and state of James Michael McCormick from "Houston, Tex." to:

-- James Michael McCormick, Baton Rouge, LA --.

Signed and Sealed this

Seventeenth Day of April, 2001

Attest:

Nicholas P. Godici

NICHOLAS P. GODICI

*Attesting Officer* *Acting Director of the United States Patent and Trademark Office*